United States Statutory Invention Registration [19]

[11] Reg. Number: H265

Bonde et al. [43] Published: May 5, 1987

[54] PENETRATOR AMMUNITION WITH PROPULSION GAS SEAL

[75] Inventors: Robert L. Bonde, St. Louis Park; Robert E. Isleifson, Minneapolis; William L. Gorman, Fridley, all of Minn.

[73] Assignee: The United States of America as represented by the Secretary of the Army, Washington, D.C.

[21] Appl. No.: 931,508

[22] Filed: Nov. 14, 1986

[51] Int. Cl.[4] ..... F42B 13/16

[52] U.S. Cl. ..... 102/521; 102/532

*Primary Examiner*—Harold J. Tudor

*Attorney, Agent, or Firm*—Anthony T. Lane; Harold H. Card, Jr.; Michael C. Sachs

[57] ABSTRACT

In a munition comprising a cartridge case, a subcaliber penetrator, and a multipartite sabot for enabling propulsive discharge of said penetrator from said case, the improvement which comprises a film of curable sealant deposited on said sabot and said penetrator so as to prevent passage of propulsion gases between the parts of said sabot, and between the sabot and the penetrator.

7 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

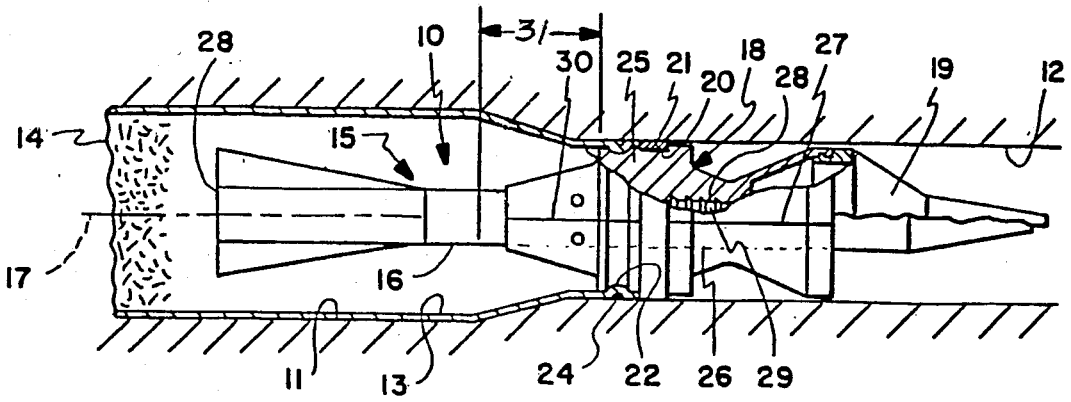
Fig. 1
Fig. 2
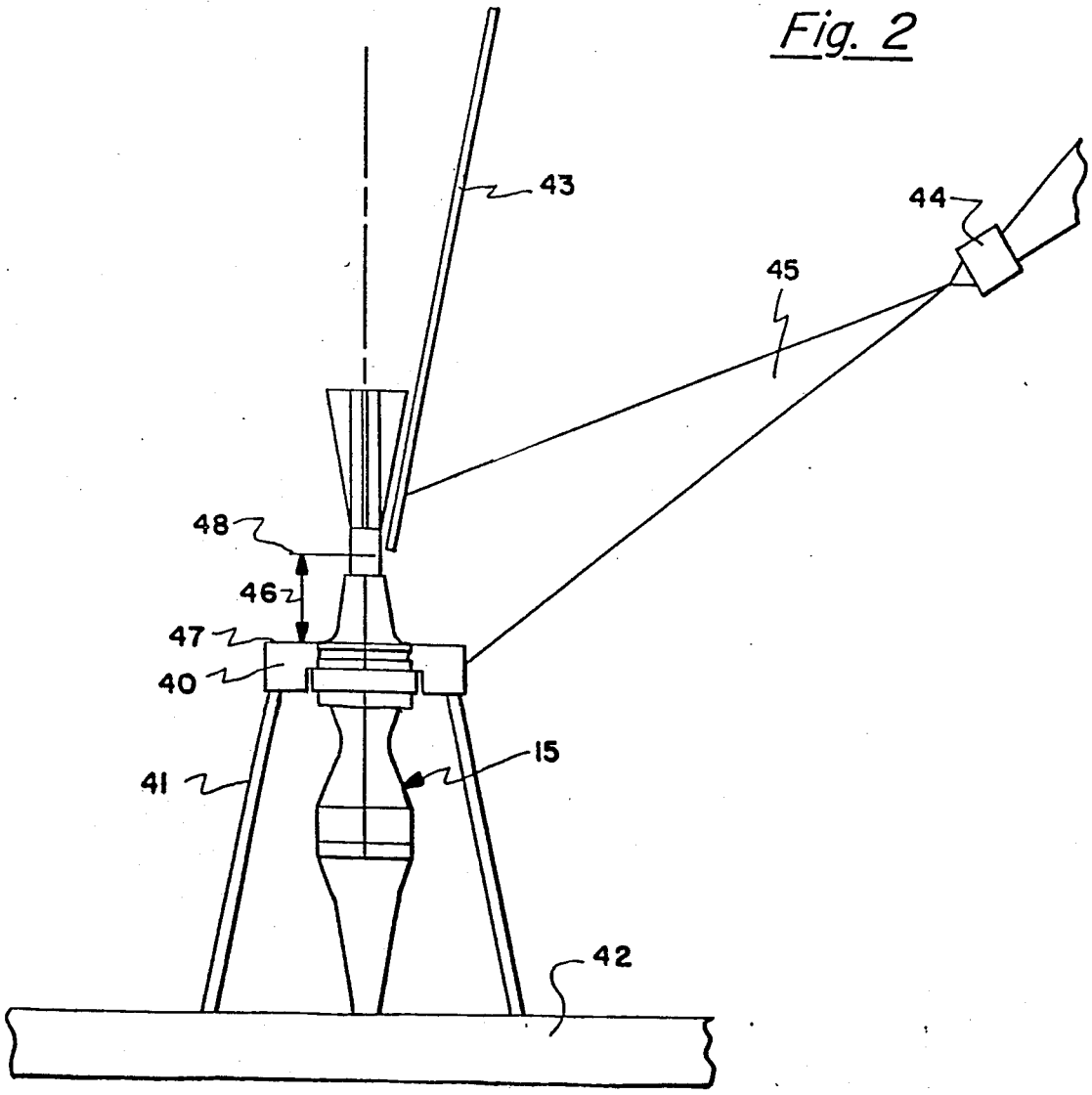

PENETRATOR AMMUNITION WITH PROPULSION GAS SEAL

GOVERNMENTAL INTEREST

The Government has rights in this invention pursuant to contract number DAAK10-82-C-0296 awarded by the Department of the Army.

OTHER APPLICATION

This case is related to application, Ser. No. 681,726, filed Dec. 14, 1984, now abandoned, of Bonde, et al., entitled "Penetrator Ammunition With Propulsion Gas Seal."

FIELD OF THE INVENTION

This invention relates to the field of ammunition, and more particularly to ammunition to be used against armored targets. It contemplates increasing the muzzle velocity and decreasing the drag of such ammunition, and hence increasing the range and penetration thereof.

For such uses there have been developed projectiles known as "penetrators" which are not necessarily explosive on impact, but are of density, configuration, and propulsive force sufficient for maximum penetrating effect. One such device is known as a "long rod" penetrator: it is of dense metal such as a tungsten alloy, and is of relatively small diameter compared to its length, and compared to the bore of cannon generally available. It extends along a longitudinal axis from a forward, aerodynamic point to a rearward stabilizing fin structure. To obtain sufficient propulsion force, it is necessary to make these projectiles parts of ammunition having cartridge cases several times the body diameter of the projectile, although, of course, the mouth of the cartridge case must be large enough to pass the rearward fin structure of the projectile. Means must also be provided for guiding the relatively small penetrator down the larger barrel of the cannon and preventing the escape of propulsive gases down the barrel past the projectile.

These functions have been accomplished in the past by providing the penetrator with circumferential external buttress grooves along its midportion, to engage simular internal grooves in a multipartite sabot secured in place by a surrounding band of nylon which also acts as an obturating or rotating band to ride in the rifling of the discharging barrel, preventing escape of propulsion gases. Rearwardly the sabot is grooved for crimped connection with the mouth of the cartridge case, within which the fin structure of the penetrator is received. Forwardly the sabot is configured to engage with a protective cap during travel through the barrel: cap and sabot separate centrifugally and aerodynamically upon leaving the barrel, to avoid increasing the drag of the penetrator during flight.

It has been found that when the projectile is fired there is an undesirable escape of considerable propulsion gas through the spaces between the sabot portions, and through the space between the penetrator and the rear ends of those portions.

In the past two procedures have been tried for preventing gas leakage. The first procedure involves laying beads of a sealant (RTV silicone) along the rearward lines of contact between the sabot portions, and along the line between the penetrator and those portions. The latter bead was found to be retained in part on the penetrator at separation, and thus to degrade performance by increasing the aerodynamic drag in flight. The second procedure was supplying a molded silicone rubber boot to fit over the rear portion of the sabot and the adjacent penetrator. This procedure added a rather costly hand assembly step to manufacture of the ammunition, and also required so much energy to rupture it at separation that performance was degraded, and the flight of the penetrator was often disturbed.

BRIEF DESCRIPTION OF THE INVENTION

According to the present invention, the assembled penetrator, with sabot and rotating band, is placed in a rotating fixture, where the affected areas are sprayed with a film of silicone rubber which is then cured. The film is lighter than the former boot, requires less force to rupture, and strips cleanly at separation, subjecting the penetrator in flight to minimum drag and minimum course deviation.

Various advantages and features of novelty which characterize the invention are pointed out with particularity in the claims annexed hereto and forming a part hereof. However, for a better understanding of the invention, its advantages, and object attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views, FIG. 1 shows a cartridge embodying the invention, in partial section, and FIG. 2 illustrates a procedure for accomplishing the invention.

DESCRIPTION OF THE PREFERRED EMBODIMENT

In the drawing a cartridge 10 according to the invention is shown in the chamber 11 of a cannon having a barrel 12. Munition 10 comprises a cartridge case 13 containing a propellant 14, a projectile 15 in the form of a "long rod" penetrator 16, extending along an axis 17 from a forward point to a rearward fin structure, and a sabot 18 which includes a separable protective front cap partially shown at 19, and which has a first groove 20 for receiving a nylon obturator ring 21 and a second groove 22 for connecting the sabot with the mouth of the cartridge case at a crimp 24. Sabot 18 is formed in multiple parts 25 and 26 having a mating plane 27 containing the axis of the penetrator. As is usual in such projectiles, a median portion of the penetrator 16 is provided with external buttress grooves 29 which engage internal teeth 28 in the sabot. The parts are held in assembled relation by ring 21.

When the cartridge is fired, the penetrator and sabot are forced from the cartridge case and out of barrel 12, ring 21 preventing escape of propulsion gas past the missile. After the projectile leaves the barrel, aerodynamic and centrifugal forces remove cap 19 and separate the parts 25 and 26 of the sabot by breaking ring 21, so that penetrator 16 continues in flight in an aerodynamically clean form.

Propulsion of the projectile is caused by pressure from the propulsive gas on the rear end 28 of the penetrator and on the rear conical portion of the sabot, the pressure on the latter also forcing the sabot parts against the penetrator to reduce leakage of gas along the penetrator.

It has been found, however, that the slight angular gap 31 around the ends of the sabot parts and the slight linear gaps between the sabot parts, one of which is shown at 30, not only prevent proper seal between the sabot and the penetrator but permit considerable pressure loss. This defeats the frictional force between the sabot and penetrator which is necessary to accelerate the rear portion of the penetrator and prevent a tensile failure at the rear groove. Our invention avoids this by a procedure shown in FIG. 2. Here the assembled projectile 15 is mounted in an elastic polymer ring 40 carried by a support 41 on a rotating table 42 to rotate behind a shield 43. A suitable sealant such as liquid silicone rubber which may be thinned with a diluent such as heptane which is discharged out nozzle 44 as a spray 45, to form a sealing film over the portion 46 of the projectile between the lines 47 and 48, and the projectile is thereafter removed from ring 40, after which the film is cured. The thickness of the film is sufficient to prevent escape of gases through the gaps referred to above, and yet has been found to tear and strip readily from the parts during separation, leaving no residue to add drag to the penetrator. The film has further advantage over a molded boot in that it is a conformal coating and therefore is insensitive to the exact sabot configuration. A thin molded boot becomes difficult to assemble and must match the sabot geometry precisely. The weight of the film is also less than that of a molded boot or of sealing beads.

From the above it will be evident that we have invented a structure and procedure by which undesirable leakage of the propulsion gases in a penetrator munition is prevented.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. In a munition comprising a cartridge case, a subcaliber penetrator, and a multipartite sabot for enabling propulsive discharge of said penetrator from said case, the improvement which comprises a film of curable sealant deposited on said sabot and said penetrator to prevent passage of propulsion gases between the parts of the sabot.

2. In a munition comprising a cartridge case, a subcaliber penetrator, and a multipartite sabot for enabling propulsive discharge of said penetrator from said case, the improvement which comprises a film of curable sealant deposited on said sabot and said penetrator to prevent passage of propulsion gases between the sabot and the penetrator.

3. In a munition comprising a cartridge case, a subcaliber penetrator, and a multipartite sabot for enabling propulsive discharge of said penetrator from said case, the improvement which comprises a film of curable sealant deposited on said sabot and said penetrator to prevent passage of propulsion gases between the parts of said sabot, and between the sabot and the penetrator.

4. In a munition, a subcaliber penetrator, a multipartite sabot engaging said penetrator peripherally, and a film of curable sealing material deposited on said sabot and said penetrator over an area susceptible of escape of propulsion gases, said film being of sufficient thickness to prevent said escape of said gases.

5. In a munition, in combination:

a subcaliber penetrator;

a sabot comprising a plurality of segments surrounding a medial portion of said penetrator and in mutual engagement lengthwise of said penetrator;

a rotating ring surrounding said segments medially for securing them to said penetrator, so that spaces exist for lengthwise passage of propulsion gas between said portions, and between said sabot and said portions;

and a film of curable sealant overlying said spaces to prevent said passage of gas.

6. A munition according to claim 5 in which said sealant comprises silicone rubber diluted with heptane or other suitable diluent.

7. The method of preventing the escape of propulsion gases between the sabot and the penetrator of a subcaliber penetrator munition which comprises spraying a coating of curable sealant over the sabot and penetrator throughout an area susceptible of passage of propulsion gases, and curing the sealant.

* * * * *